(12) United States Patent
Griffiths et al.

(10) Patent No.: US 8,430,208 B2
(45) Date of Patent: Apr. 30, 2013

(54) CENTRIFUGALLY-OPERATED APPARATUS

(75) Inventors: Stephen Griffiths, Nr Caernarfon (GB); Kurt D. Dietrich, Huntersville, NC (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 13/566,188

(22) Filed: Aug. 3, 2012

(65) Prior Publication Data
US 2012/0298451 A1   Nov. 29, 2012

Related U.S. Application Data

(62) Division of application No. 12/821,421, filed on Jun. 23, 2010, now Pat. No. 8,256,574.

(51) Int. Cl.
*A62B 1/10* (2006.01)
(52) U.S. Cl.
USPC .................... 182/239; 182/234; 242/383.3
(58) Field of Classification Search .......... 248/234, 248/239; 242/383.3
See application file for complete search history.

(56) References Cited

U.S. PATENT DOCUMENTS

| | | | | |
|---|---|---|---|---|
| 3,711,037 A | * | 1/1973 | Jakob ........................... | 242/383.1 |
| 4,168,810 A | * | 9/1979 | Sack et al. ................... | 242/383.2 |
| 4,228,970 A | | 10/1980 | Morinaga | |
| 4,511,123 A | | 4/1985 | Ostrobrod | |
| 4,749,143 A | * | 6/1988 | Tsukamoto et al. ....... | 242/382.2 |
| 4,877,110 A | | 10/1989 | Wolner | |
| 5,186,289 A | * | 2/1993 | Wolner et al. ................. | 188/180 |
| 6,279,682 B1 | * | 8/2001 | Feathers ....................... | 182/239 |
| 6,918,480 B2 | | 7/2005 | Chevalier | |
| 7,237,650 B2 | | 7/2007 | Casebolt | |
| 7,281,620 B2 | | 10/2007 | Wolner | |
| 2009/0084883 A1 | * | 4/2009 | Casebolt et al. ............. | 242/389 |
| 2009/0178887 A1 | | 7/2009 | Reeves | |
| 2009/0211847 A1 | * | 8/2009 | Balquist et al. .............. | 182/231 |
| 2009/0211848 A1 | | 8/2009 | Parker | |

FOREIGN PATENT DOCUMENTS

| | | |
|---|---|---|
| WO | WO 2007/007119 | 1/2007 |
| WO | WO 2008/008225 | 1/2008 |
| WO | WO 2009-000015 | 12/2008 |
| WO | WO 2009/022122 | 2/2009 |

OTHER PUBLICATIONS

Turbolite Product Literature, Miller Turbolite Personal Fall Limiter (Mar. 2008), 4 pages.
International Search Report, PCT/US2011/039934, mailed Mar. 2, 2012, 3 pages.

* cited by examiner

*Primary Examiner* — Alvin Chin Shue
(74) *Attorney, Agent, or Firm* — Kenneth B. Wood (57) ABSTRACT

Herein is disclosed a centrifugally-operated apparatus that comprises at least a shaft with an axis of rotation and a pawl that is coaxially mounted on the shaft with at least a portion of the pawl being movable radially inwardly and outwardly from the shaft. The axis of rotation of the shaft passes through the pawl, at a location that is radially offset from the center of mass of the pawl. Rotation of the shaft and pawl above a predetermined speed can cause at least the movable portion of the pawl to be moved radially outward from the shaft, in which position an engaging end of the movable portion of the pawl may engage with a component such as a ratchet.

20 Claims, 5 Drawing Sheets

CENTRIFUGALLY-OPERATED APPARATUS

CROSS REFERENCE TO RELATED APPLICATIONS

This application is a divisional of U.S. patent application Ser. No. 12/821,421, filed Jun. 23, 2010, now issued as U.S. Pat. No. 8,256,574, the disclosure of which is incorporated by reference in its entirety herein.

BACKGROUND

Centrifugally-operated apparatus have found wide use in braking assemblies, clutches and the like. Centrifugally-operated apparatus are often used, for example, in safety equipment designed to arrest or limit the rate of fall of a person or object. Such safety equipment may include e.g. lifelines, self-retracting lifelines, fall arrestors, fall limiters, descenders, and the like.

SUMMARY

Herein is disclosed a centrifugally-operated apparatus that comprises at least a shaft with an axis of rotation and a pawl that is coaxially mounted on the shaft with at least a portion of the pawl being movable radially inwardly and outwardly from the shaft. The axis of rotation of the shaft passes through the pawl, at a location that is radially offset from the center of mass of the pawl. Rotation of the shaft and pawl above a predetermined speed can cause at least the movable portion of the pawl to be moved radially outward from the shaft, in which position an engaging end of the movable portion of the pawl may engage with a component such as a ratchet.

Thus in one aspect, herein is disclosed a centrifugally-operated apparatus comprising: a shaft with an axis of rotation generally aligned with the long axis of the shaft; a pawl that is coaxially mounted on the shaft and at least a portion of which is movable radially inwardly and outwardly from the shaft and that comprises an engaging end; and, a biasing mechanism that biases the engaging end of the pawl radially inwards toward the shaft, wherein the axis of rotation of the shaft passes through the pawl, and wherein the pawl comprises a center of mass that is radially offset from the axis of rotation of the shaft.

These and other aspects of the invention will be apparent from the detailed description below. In no event, however, should the above summaries be construed as limitations on the claimed subject matter, which subject matter is defined solely by the attached claims, as may be amended during prosecution.

Like reference numbers in the various figures indicate like elements. Some elements may be present in identical or equivalent multiples; in such cases only one or more representative elements may be designated by a reference number but it will be understood that such reference numbers apply to all such identical elements. Unless otherwise indicated, all figures and drawings in this document are not to scale and are chosen for the purpose of illustrating different embodiments of the invention. In particular the dimensions of the various components are depicted in illustrative terms only, and no relationship between the dimensions of the various components should be inferred from the drawings, unless so indicated. Although terms such as "top", bottom", "upper", lower", "under", "over", "front", "back", "outward", "inward", "up" and "down", and "first" and "second" may be used in this disclosure, it should be understood that those terms are used in their relative sense only unless otherwise noted.

DETAILED DESCRIPTION

Figure 1:
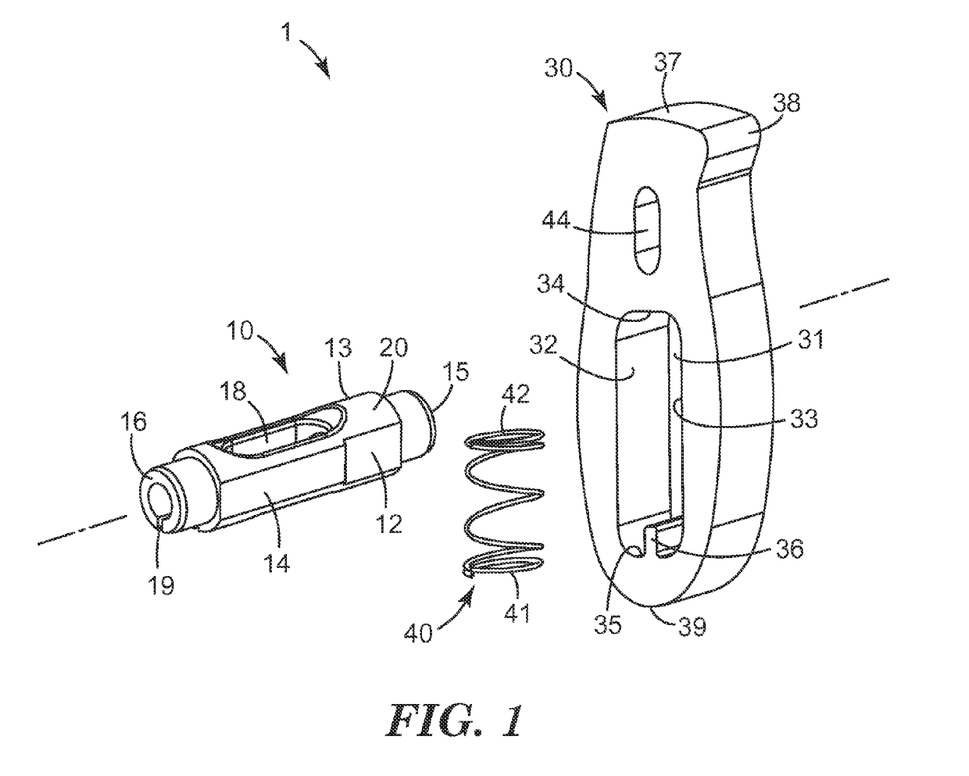
FIG. 1 is a partially exploded side perspective view of an exemplary centrifugally-operated apparatus as disclosed herein.
Figure 2:
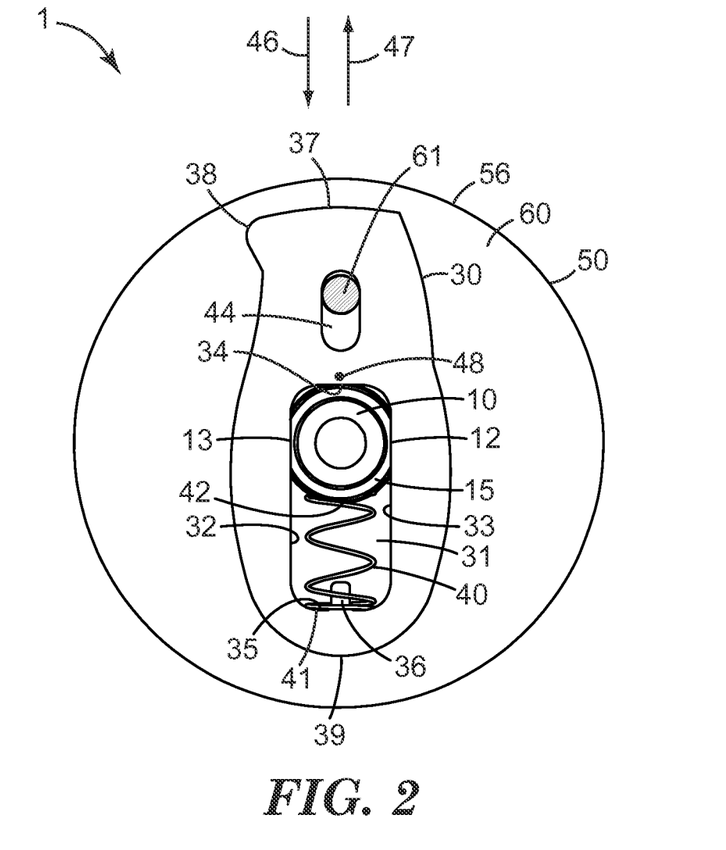
FIG. 2 is an elevation view of the centrifugally-operated apparatus of FIG. 1.

One embodiment of a centrifugally-operated apparatus 1 according to the present disclosure is illustrated in an exemplary manner in FIGS. 1 and 2, and comprises elongated shaft 10 with a long axis that generally coincides with its axis of rotation. Apparatus 1 also comprises pawl 30 that is coaxially mounted upon shaft 10, by which is meant that pawl 30 and shaft 10 share a common axis of rotation that passes through pawl 30. The condition that the common axis of rotation passes through pawl 30 encompasses any situation in which the axis of rotation passes through any portion of the volume generally bounded by the outermost surfaces of pawl 30; it is not necessary that the axis of rotation actually pass through a physical portion of pawl 30. Thus, this condition encompasses designs of the type shown in the illustrative embodiment of FIGS. 1 and 2, in which the common axis of rotation passes through through-opening 31 of pawl 30. As illustrated in FIGS. 1 and 2, such coaxial mounting may be achieved for example by mounting pawl 30 on shaft 10 such that an axial length 20 of shaft 10 passes through (i.e., resides within) a portion of shaft-receiving opening 31 in pawl 30.

Pawl 30 is mounted on shaft 10 so that at least a portion of pawl 30 is movable radially inwardly and outwardly from shaft 10 (i.e., is movable back and forth along a direction that is generally perpendicular to the axis of rotation of shaft 10, e.g. along the direction signified by arrows 46 and 47 in FIG. 2). Pawl 30 may be generally elongated with the long axis of pawl 30 generally coinciding with the direction of movement of pawl 30 relative to shaft 10 (as in the embodiment of FIGS. 1 and 2). Pawl 30 is mounted on shaft 10 so that pawl 30 cannot freely rotate relative to shaft 10. By this is meant that even though pawl 30 may be able to initially rotate relative to shaft 10 to some limited extent, pawl 30 encounters a hard stop before traversing an arc of more than about twenty degrees, after which pawl 30 cannot rotate further without shaft 10 rotating therewith. In some embodiments, pawl 30 cannot rotate relative to shaft 10 through an initial arc of more than about 10 degrees. In further embodiments, pawl 30 is fixedly attached to shaft 10 so that pawl 30 cannot rotate relative to shaft 10 at all.

In the illustrated embodiment of FIGS. 1 and 2, pawl 30 is mounted so that pawl 30 cannot freely rotate relative to shaft 10, by way of shaft-receiving through-opening 31 in pawl 30 comprising a slot with first and second opposing surfaces 32 and 33 that are generally flat, parallel, and inwardly-oppositely facing, in combination with the providing of generally flat, parallel, and outwardly-oppositely facing surfaces 12 and 13 of axial length 20 of shaft 10. Surfaces 32 and 33 of shaft-receiving slot 31 of pawl 30 are in proximity to, and facing, surfaces 13 and 12 respectively of axial length 20 of shaft 10, with these surfaces being generally parallel to each other so as to establish and limit the direction in which pawl 30 is movable relative to shaft 10. Such an arrangement can allow pawl 30 to slide radially inward and outward along a direction generally aligned with surfaces 32 and 33 of shaft-receiving slot 31 (with surfaces 12 and 13 being in slidable contact with surfaces 33 and 32, respectively), but may not allow pawl 30 to rotate freely relative to shaft 10. The width of pawl slot 31 (i.e., the distance between surfaces 32 and 33) is at least very slightly larger than the distance between surfaces 12 and 13 of axial length 20 of shaft 10, in order to allow axial length 20 of shaft 10 to be positioned within slot 31. Within this general limit, the width of pawl slot 31 can be set very close to the distance between surfaces 12 and 13, or somewhat larger than this distance, as desired, e.g. in order to allow a desired initial amount by which pawl 30 may initially rotate relative to shaft 10 prior to the initial rotation reaching a limit. If desired, a flat surface portion can also be provided within axial length 20 of shaft 10 that interfaces with surface 34 of through-opening 31 of pawl 30, to further assist in minimizing the ability of pawl 30 to rotate relative to shaft 10.

Other pawl designs and/or methods of mounting at least one pawl upon a shaft so as to achieve similar ends may be envisioned and are within the scope of the disclosures herein. For instance, those of ordinary skill will appreciate that FIGS. 1 and 2 illustrate embodiments in which the entirety of pawl 30 can be moved; in other configurations, pawl 30 may comprise a portion that is movable radially inwardly and outwardly from shaft and another portion that is not so movable. All that is required is that at least a portion of pawl 30 be so movable and comprise an engaging end 37 that is configured to engage an element with which such engagement is desired, as discussed later herein. Engaging end 37 of pawl 30 may comprise at least one engaging tooth 38 which may face forward in the direction of rotation of shaft 10 and pawl 30. Pawl 30 may have opposite end 39 that is not an engaging end.

Pawl 30 is biased such that engaging end 37 of pawl 30 is biased radially inward (e.g., in the direction indicated by arrow 46 of FIG. 2) along the aforementioned direction in which at least a portion of pawl 30 is movable relative to shaft 10. This can be accomplished by the use of at least one biasing mechanism, which may comprise any suitable mechanism capable of applying a suitable biasing force and which may be interfaced with any portion of pawl 30 in any suitable manner. It is not required that the biasing force be applied directly to engaging end 37 of pawl 30. In FIGS. 1 and 2, for example, the biasing force is applied to surface 35 of through-opening 31 of pawl 30, as described in further detail below. The biasing mechanism may comprise a separate piece from pawl 30 and shaft 10; or it may be attached to, or may even be a part of, one or both of pawl 30 and shaft 10. In some embodiments, the biasing mechanism may comprise a spring 40. Any suitable spring may be used, e.g. a coil spring, flat spring, leaf spring, V-spring, volute spring, cantilevered spring, tension spring, compression spring, torsion spring, and the like. In the exemplary embodiment of FIGS. 1 and 2, spring 40 comprises a coil spring that occupies a portion of slot 31 of pawl 30 that is not occupied by axial length 20 of shaft 10. A first end 41 of spring 40 is seated against spring-receiving surface 35 of slot 31 of pawl 30; second end 42 of spring 40 is seated against a surface of axial length 20 of shaft 10, as illustrated in FIG. 2. Spring-receiving surface 35 of slot 31 may be generally flat; or it may comprise one or more features that enhance the seating of end 41 of spring 40. For example, in the exemplary embodiment of FIGS. 1 and 2, post 36 serves this function. Similarly, the surface of axial length 20 of shaft 10 against which end 42 of spring 40 is seated, may comprise one or more such spring-seating features (not shown in any figure).

Pawl 30 comprises a center of mass 48 that is radially offset from the axis of rotation of shaft 10 and pawl 30. Specifically, the center of mass of pawl 30 is offset in a direction radially outward toward engaging end 37 of pawl 30, from shaft 10 and the axis of rotation thereof. Thus, upon rotation of shaft 10 and pawl 30 mounted thereto about their common axis of rotation, a centrifugal force will be developed owing to the center of mass of pawl 30 being located radially outward from the axis of rotation. This force will urge engaging end 37 of pawl 30 radially outward from shaft 10 (e.g., in the direction indicated by arrow 47 of FIG. 2).

In the illustration of FIG. 2, an exemplary, potentially suitable location 48 for the radially-offset center of mass of pawl 30 is illustrated. However, those of ordinary skill will appreciate that the radially-offset center of mass of the pawl does not have to coincide with a physical portion of pawl 30. For example, the center of mass of pawl 30 may fall within through-opening 31.

As mentioned, a biasing mechanism is provided (e.g., spring 40) that imparts a biasing force that urges engaging end 37 of pawl 30 radially inward toward shaft 10. Appropriate design of the above-described components, including e.g. the force constant of spring 40, the location of the center of mass of pawl 30 and the distance between the center of mass and the axis of rotation, etc., can provide that when the speed of rotation of shaft 10 and pawl 30 is at or below a certain (e.g., predetermined) value, the biasing force applied by the biasing mechanism will maintain pawl 30 in a configuration in which engaging end 37 of pawl 30 is positioned at a first radial distance from the axis of rotation of shaft 10. Rotation of shaft 10 and pawl 30 above this speed will result in centrifugal force overcoming the biasing force (e.g., such that spring 40 is axially compressed at least slightly) with the result that engaging end 37 of pawl 30 moves radially outward to a second radial distance from the axis of rotation of shaft 10.

In some embodiments, only a portion of pawl 30 (including engaging end 37) may so move. In other embodiments (e.g., of the type exemplified in FIGS. 1 and 2) the entirety of pawl 30 may move so as to move engaging end 37 to the second radial distance. Those of ordinary skill in the art will also appreciate that in the above designs, the radial outward motion of engaging end 37 of pawl 30 may occur generally along a straight line (with reference to the shaft, and disregarding the rotation of the shaft and pawl), which straight line may pass through the axis of rotation of shaft 10. This is to be contrasted with a conventional pawl that may e.g. be pivotably or hingedly mounted such that centrifugal force may cause an engaging end of the pawl to be motivated radially outward along a path (e.g., an arc) that does not pass through the axis of rotation of a shaft to which the conventional pawl is mounted directly or indirectly.

Within the general principles of operation of shaft and pawl apparatus in which the axis of rotation of the shaft passes through the body of the pawl and the pawl comprises a center of mass that is radially offset from the axis of rotation of the shaft, numerous variations are possible and are considered to be within the scope of the invention. For example, in some embodiments only a single pawl 30 may be used, as shown in FIGS. 1-2. In other embodiments, multiple pawls, e.g. spaced axially along shaft 10, may be used. Pawl 30 may have any suitable shape and/or number of planes of symmetry as desired (for example, in the illustrated embodiment of FIGS.

1 and 2, pawl 30 comprises one plane of symmetry). Shaft-receiving opening 31 of pawl 30 may comprise a border that is continuous and completely contained within the body of pawl 30 (as shown in FIG. 1); or, the border may comprise one or more discontinuities, e.g. that may extend to an edge of pawl 30. Shaft 10 may comprise a bore extending along the long axis of shaft 10 from end 15 to end 16; or, at least some axial portion of shaft 10 may be solid. Ends 15 and 16 of shaft 10 may be slightly smaller in diameter than an axially interior portion of shaft 10 (as shown in FIG. 1); or, ends 15 and 16 could be of similar diameter or even of larger diameter than an axially interior portion of shaft 10. Shaft 10 and/or pawl 30 and/or spring 40 may be made of metal (e.g., steel), or of any other suitable material.

Centrifugally-operated apparatus 1 may be used in combination with a ratchet ring 70 (e.g., as in the illustrative embodiment of FIG. 3), with which engaging end 37 (e.g., engaging tooth 38) of pawl 30 is capable of engaging and that is located radially outwardly from shaft 10 and pawl 30. The aforementioned biasing mechanism can bias engaging end 37 of pawl 30 toward a first radial position in which engaging end 37 does not engage ratchet ring 70. The rotating of shaft 10 and pawl 30 mounted thereupon above the predetermined speed can cause the centrifugal force to overcome the biasing mechanism and cause engaging end 37 of pawl 30 to be urged radially outward to a second radial position in which engaging end 37 of pawl 30 engages ratchet ring 70.

The term ratchet ring is used broadly to denote any structure that can present at least one ratchet tooth 71 in a configuration in which it is capable of being engaged by engaging end 37 of pawl 30. Often a ratchet ring will comprise a main body 72 that presents one, two, three, or more ratchet teeth 71 annularly spaced around (i.e., radially outward of) an area swept out by the path of rotation of one or more pawls, as in the exemplary embodiment of FIG. 3. While it may conveniently be generally ring shaped, main body 72 does not necessarily have to be ring shaped; all that is needed is for main body 72 to support the at least one ratchet tooth 71 so that it can be engaged by engaging end 37 of pawl 30. In the particular illustrative embodiment of FIG. 3, which is discussed in further detail later herein, ratchet ring 70 is fixedly attached (e.g. by way of bolts 148 and 149) to housing 120 of safety device 100. In this embodiment, ratchet ring 70 is unable to rotate relative to housing 120; therefore if engaging end 37 of pawl 30 engages a tooth 71 of ratchet ring 70, pawl 30 may be unable to rotate further with respect to housing 120 of device 100.

Figure 3:
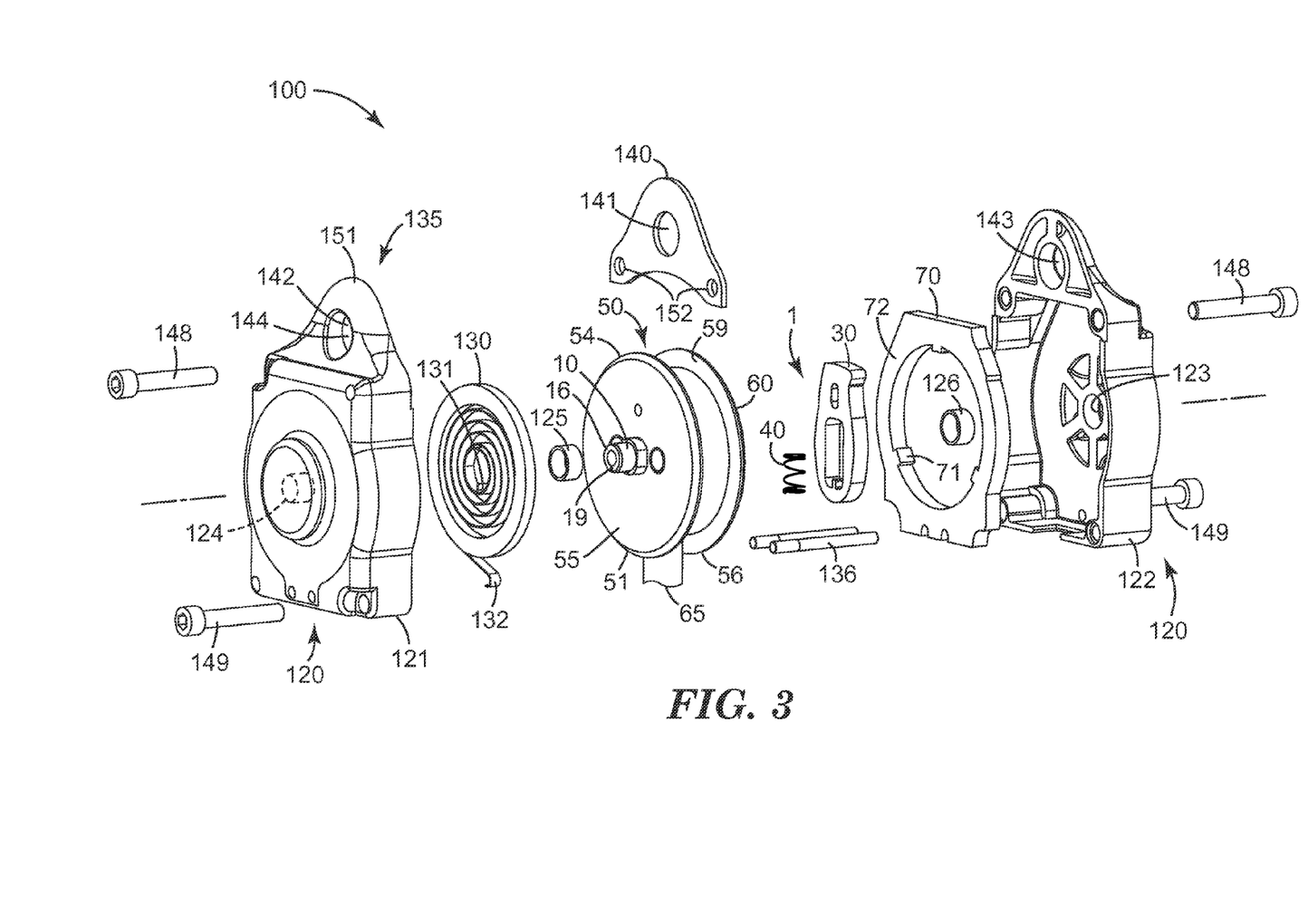
FIG. 3 is a partially exploded side perspective view of an exemplary self-retracting lifeline comprising an exemplary centrifugally-operated apparatus as disclosed herein.
Figure 4:
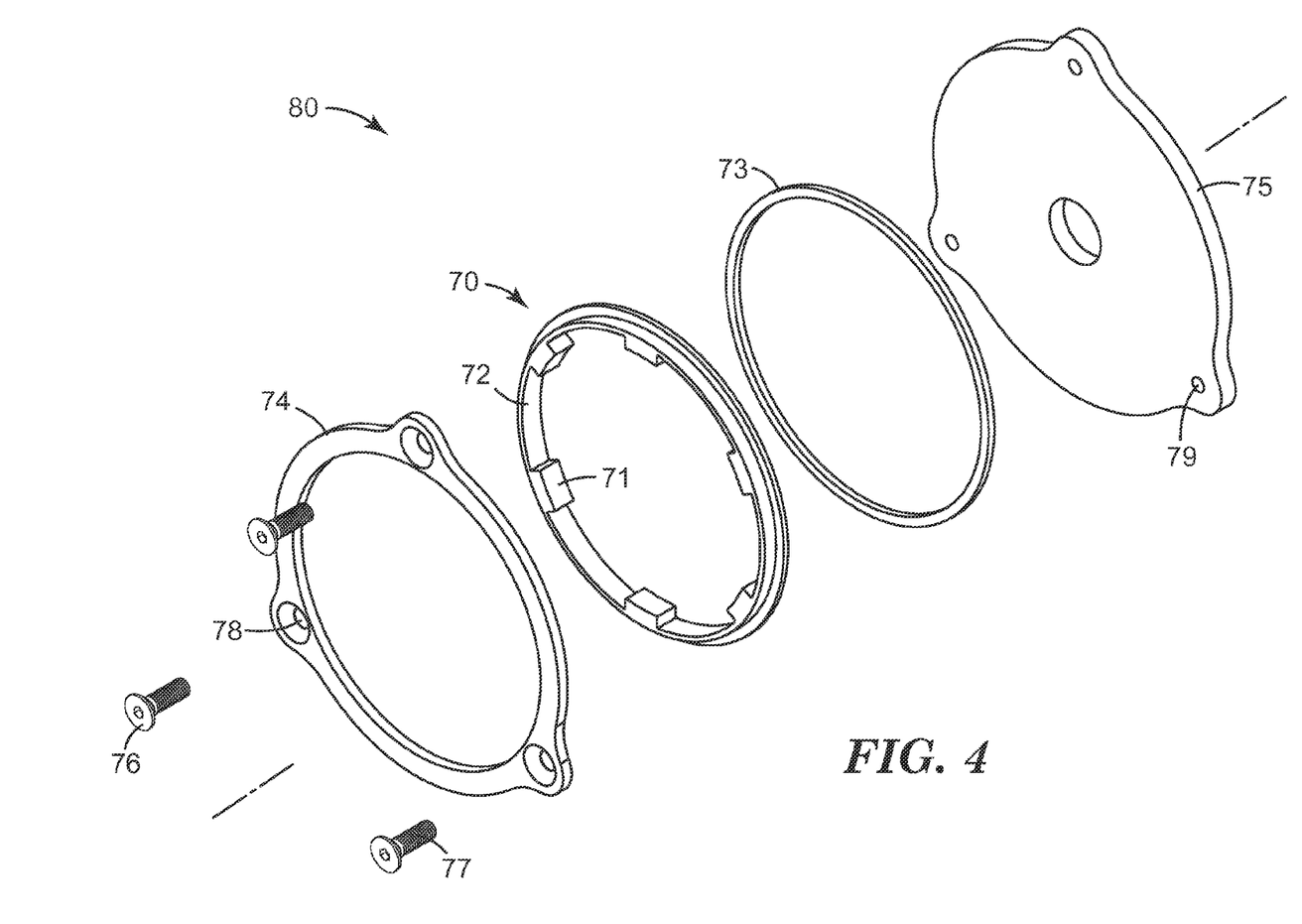
FIG. 4 is an exploded side perspective view of an exemplary friction brake that can be used with the centrifugally-operated apparatus disclosed herein.

In other exemplary embodiments, ratchet ring 70 may be provided as part of friction brake 80 as shown in FIG. 4. Such a friction brake may comprise, in addition to ratchet ring 70, friction ring 73, pressure plate 74, and backing plate 75. Bolts 76 (or any other suitable fastener) can be used to fasten these components together, with pressure plate 74 and backing plate 75 combining to press friction ring 73 against ratchet ring 70 with a desired, e.g. predetermined, force. In such embodiments, friction brake 80 may be mated e.g. to housing 120 (e.g., by protruding shanks 77 of bolts 76 that pass through apertures 79 of backing plate 75 and reside within and/or are attached to receptacles provided in housing 120) of device 100 to provide that at least e.g. backing plate 75 of friction brake 80 is generally unable to rotate relative to housing 120. Use of friction brake 80 (i.e., in place of fixedly attached ratchet ring 70 in device 100 of FIG. 3) in such manner can provide that, upon the engaging of engaging end 37 of pawl 30 with a tooth 71 of ratchet ring 70, ratchet ring 70 may rotate at least somewhat (relative to housing 120 of device 100) before being slowed or stopped by the friction imparted by friction ring 73 under pressure from pressure plate 74 and backing plate 75. The use of ratchet ring 70 that is provided as part of friction brake 80 may thus provide a more gradual stopping of the rotation of pawl 30 and thus of shaft 10, e.g. in comparison to a ratchet ring that is fixedly attached to a housing of a safety device such that the ratchet ring cannot rotate relative to the housing, e.g. as in the design shown in FIG. 3. Ratchet ring 70, backing plate 75, and pressure plate 74 may be made of any suitable materials, including e.g. metals such as steel, brass, bronze, and the like. In some embodiments, at least one or more of these components (e.g., ratchet ring 70) may be comprised of a molded polymeric material, as long as the component(s) suitably performs the desired function. Friction ring 73 may be made of any suitable material that will provide the desired frictional properties. Such materials may include e.g. cork, rubber, or any other natural or synthetic polymeric materials, and the like. In some embodiments, rather than a separate backing plate 75 being used, an interior surface of a housing (e.g., of housing piece 122) may be used to press friction ring 73 against ratchet ring 72. Such arrangements will be understood by those of skill in the art to be encompassed within the present use of the term friction brake.

If ratchet ring 70 is provided as part of friction brake 80, mating features (e.g., shanks 77 of bolts 76) of friction brake 80 may be inserted into complementary mating features of housing 120, e.g. to provide that pressure plate 74 and/or backing plate 75 (if present) of friction brake 80 is unable to rotate relative to housing 120 of device 100. In one embodiment of this type, the amount of force with which friction ring 73 is pressed against ratchet ring 70 may be set during the attaching of friction brake 80 to housing 120 (e.g. by amount to which each shank of a bolt 76 is threadably engaged and tightened into a threaded socket of housing 120). In other embodiments, friction brake 80 is a preassembled and pretorqued friction brake, meaning that the components of friction brake 80 are secured to each other, and the amount of force applied by pressure plate 74 and backing plate 75 to friction ring 73 and ratchet ring 70 is set, prior to, and independently of, the mating of friction brake 80 with housing 120 and/or the securing of friction brake 80 to housing 120. In such cases, preassembled and pretorqued friction brake 80 may be later attached to housing 120; or, friction brake 80 may be provided in the form of a floating brake that is mated with housing 120 (i.e., so as to prevent at least backing plate 75 of friction brake 80 from rotating relative to housing 120) while not being actually attached to housing 120. The optional use of preassembled and pretorqued friction brakes, and the use of floating friction brakes, is discussed in further detail in copending U.S. patent application Ser. No. 12/821, 760, titled PREASSEMBLED AND PRETORQUED FRICTION BRAKE AND METHOD OF MAKING A SAFETY DEVICE CONTAINING SUCH A FRICTION BRAKE, filed evendate herewith, which is herein incorporated by reference.

While the above illustrations are primarily concerned with braking applications, it should be understood that centrifugally-operated apparatus 1 may find use in any desired application, including those in which it is desired that pawl 30 cause ratchet ring 70 to rotate, rather than in which it is desired that ratchet ring 70 cause the rotation of pawl 30 to slow or stop. That is, apparatus 1 may find use in centrifugal clutches in a wide variety of mechanical devices, whether motorized, manual, and so on. However, apparatus 1 may be particularly useful in applications in which it is desired that ratchet ring 70 serve a braking function. Such embodiments include in particular safety applications in which it is desired to arrest or limit the rate of fall of a person or object. Such safety equipment includes e.g. lifelines, self-retracting lifelines, fall arrestors, fall limiters, descenders, and the like.

An embodiment in which apparatus 1 serves a braking function is illustrated in FIG. 3, which presents a partially exploded view of an exemplary self-retracting lifeline 100. In such an embodiment, shaft 10 and pawl 30 may be used in combination with drum 50, upon which is wound (e.g., spirally wound) a length of line 65 (with the term line broadly encompassing any elongated windable load-bearing member, including e.g. webbing, cable, rope, etc., made of any suitable synthetic or natural polymeric material, metal, etc., or any combination thereof). Drum 50 may be coaxially mounted on shaft 10, axially adjacent to pawl 30, as shown in FIG. 3. Drum 50 may comprise first and second flanges 51 and 56, each extending generally radially outward from shaft 10, and which are positioned generally parallel to each other to define a space therebetween within which line 65 may be at least partially wound. Flanges 51 and 56 may be made of e.g. molded plastic or any other suitable material. Flange 51 may comprise outward face 55 and inward face 54; flange 56 may comprise outward face 60 and inward face 59. Pawl 30 may be placed e.g. adjacent to outward face 60 of flange 56, as shown in FIG. 2.

Figure 5:
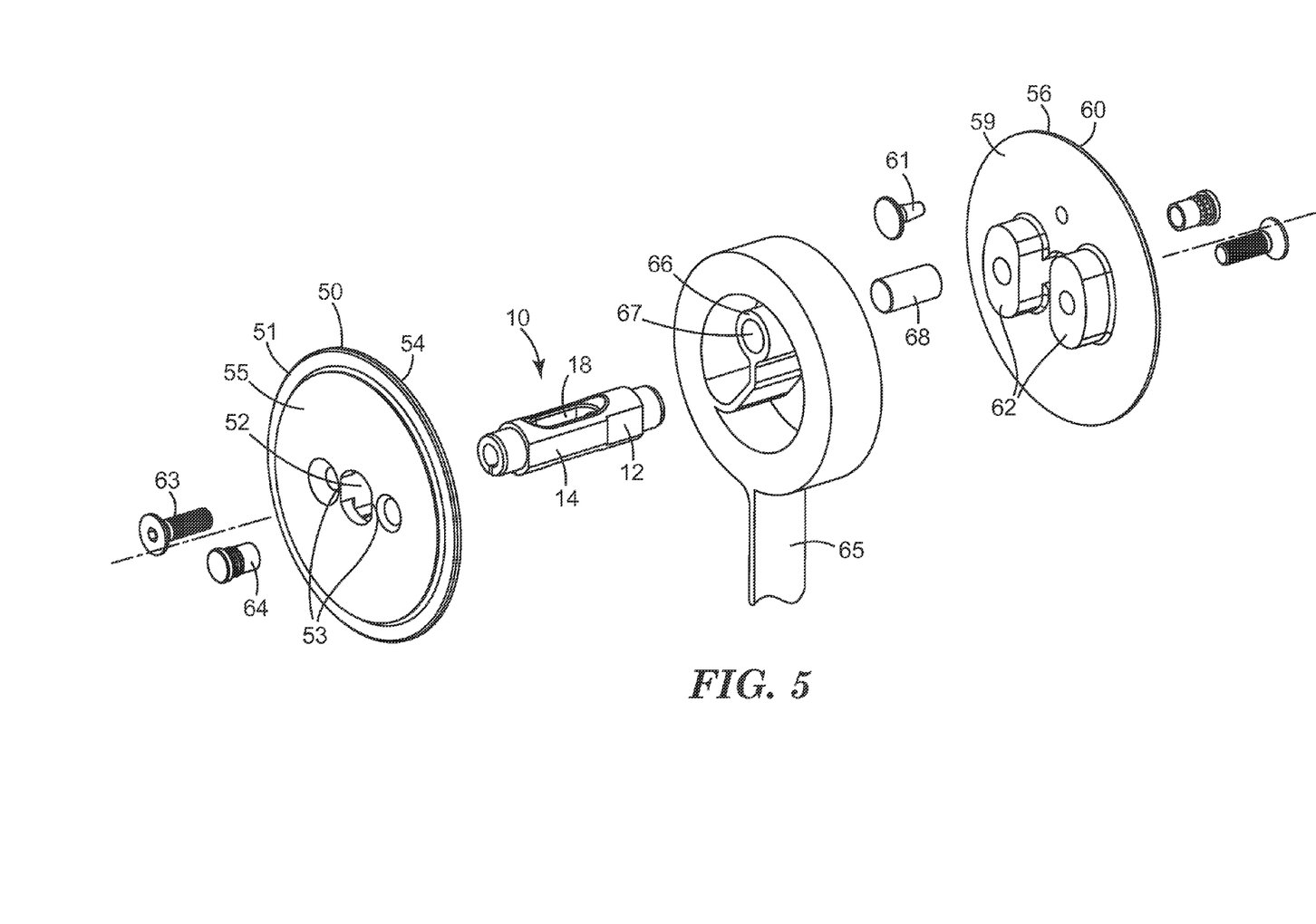
FIG. 5 is an exploded side perspective view of an exemplary drum and line that can be used with the centrifugally-operated apparatus disclosed herein.

An exemplary drum 50 is shown in one embodiment in exploded perspective view in FIG. 5. In such embodiments, flanges 51 and 56 of drum 50 may be separate pieces that are fastened together e.g. by bolt(s) 63 (e.g. in combination with threaded socket inserts 64) and/or by any other suitable fastener(s). In alternative embodiments, drum 50 may be comprised of a single unitary piece (e.g., a single piece of injection molded polymeric material). It may be desired that drum 50 be unable to freely rotate relative to shaft 10 (and therefore relative to pawl 30). This may be provided by any suitable mechanism or design. For example, a drum flange opening and the axial length of the shaft that passes through the drum flange opening can each comprise at least one interfering feature, the interfering features of the flange and of the shaft mating with each other so as to physically prevent the drum from freely rotating relative to the shaft. For example, in the exemplary illustrations of FIGS. 3 and 5, opening 52 (which is otherwise generally circular) of flange 51, comprises at least one linear (flat) portion 53. Likewise, the axial length of shaft 10 that resides within opening 52 of flange 51, comprises at least one linear (flat) surface 14. Flat surface(s) 53 of opening 52 of flange 51, and flat surface(s) 14 of shaft 10, mate together and thus interfere with free rotation of flange 51 of drum 50 relative to shaft 10. Similar features can be provided in flange 56 although they are not visible in FIG. 5. It will be understood that such an interfering feature does not have to be a flat surface, but rather can be any protrusion, recession, fastener (such as, e.g. a cotter pin), etc., that can interfere with free rotation of drum 50 about shaft 10. And, of course, in some embodiments drum 50 can be attached (e.g., bolted, glued, etc.) to shaft 10 to prevent any such rotation of drum 50 about shaft 10.

One end 67 of line 65 may be attached to shaft 10. While this may be done in any suitable manner, it is possible to attach line 65 to shaft 10 in such manner as to assist in preventing drum 50 from freely rotating relative to shaft 10. One such method of attachment is shown in exemplary manner in FIG. 5. End 67 of line 65 is attached to an axial portion of shaft 10 that resides within the space defined between flanges 51 and 56 of drum 50. Drum 50 comprises at least one post 62. The interference of line 65 with post(s) 62, particularly when line 65 is wound at least partially within the space defined between flanges 51 and 56, may assist in preventing drum 50 from freely rotating relative to shaft 10.

In the illustrated embodiment of FIG. 5, end 67 of line 65 is attached by shaft 10 by way of loop 66 which is passed through slot 18 in shaft 10, with pin 68 being inserted within loop 66 to prevent end 67 of line 65 from being withdrawn back through slot 18. The interference of line 65 (particularly if line 65 comprises a generally flat, wide webbing as in FIG. 5) with flanges 51 and 56 may assist in preventing drum 50 from slidably moving relative to shaft 10 in a direction along the long axis of shaft 10.

Flange 56 that is located adjacent to pawl 30, may comprise at least one additional feature. In the illustrated embodiment of FIG. 2, flange 56 comprises guide pin 61 that protrudes outwardly (e.g., in a direction generally parallel to the axis of rotation of shaft 10, pawl 30 and drum 50) from outer face 60 of flange 56. Pawl 30 comprises guiding slot 44 which is elongated in the direction along which it is desired to have pawl 30 be movable and in which pin 61 of flange 56 resides.

Returning to FIG. 3, housing 120 of device 100 may comprise first complementary housing piece 122 and second complementary housing piece 121 that are assembled and fastened together to form housing 120. The term housing is used broadly and should be understood to encompass any structure that at least partially, substantially, or nearly-completely encloses a space containing shaft 10, pawl(s) 30, drum 50, and ratchet ring 70 (whether alone or as part of friction brake 80). Pawl 30 and drum 50 may be mounted on shaft 10 as discussed previously herein. Shaft 10 may have first terminal end 15 that is rotatably seated into shaft-receiving receptacle 123 of first complementary housing piece 122, and second terminal end 16 that is rotatably seated into shaft-receiving receptacle 124 of second complementary housing piece 121. In the illustrated embodiment, first and second sleeve bearings 126 and 125 are provided within receptacles 123 and 124. Torsion spring 130 may be provided, with the inner end of spring 130 comprising tab 131 that fits into slot 19 of shaft 10 (a torsion spring that is external to drum 50 may be used as shown in FIG. 3; or an internal torsion spring may be used if desired). The outer end of spring 130 may comprise a hooked end 132 that is attached to one of guide pins 136 (pins 136 may thus serve the dual function of providing an attachment point for spring 130 and of guiding line 65 between pins 136 at the location at which line 65 extends out of housing 120). Ratchet ring 70 is provided, either as shown in FIG. 1, or as part of a friction brake 80 as discussed earlier.

Complementary housing pieces 121 and 122 may be fastened together by any suitable fastener(s). In the exemplary embodiment of FIG. 3, fastening bolts 148 and 149 are used for this purpose. Such bolts may comprise a threaded shank portion that can be threadably engaged into a threaded receptacle of a housing piece. Such a threaded receptacle may comprise e.g. a threaded surface of the housing piece material within the receptacle (which may be convenient e.g. in the case of a metal housing). Or, such a threaded receptacle may be provided e.g. by inserting a threaded socket (e.g., similar to socket 64 of drum 50 shown in FIG. 5) in the housing receptacle (such an approach may be convenient e.g. in the case of a polymeric housing). Line 65 can be extended out of a first end of device 100 (e.g., to be attached to a harness worn by a worker), with the device having a second, anchorage end 135 which may be generally opposite the end from which the line is extendable and which may be connected e.g. by an anchorage line to a secure anchorage of a worksite.

In use, self-retracting lifeline 100 is typically attached to a secure anchorage (fixed point) of a worksite structure (e.g., a girder, beam or the like). The outermost end of line 65 can then be attached (e.g., by way of a carabiner, D-ring, or the like) to a harness worn by a worker. As the worker moves away from the fixed anchorage, line 65 is extended from within housing 120; as the worker moves toward the fixed anchorage, drum 50 rotates under the urging of torsion spring 130, so that line 65 is self-retracted within housing 120 and wound upon drum 50. During such worker activities, pawl 30 is biased by the aforementioned biasing mechanism so that engaging end 37 of pawl 30 does not engage ratchet ring 70. In the event of a worker fall, the speed of rotation of shaft 10 and pawl 30 increases above a predetermined speed, whereupon engaging end 37 of pawl 30 is caused to engage with ratchet ring 70 as explained earlier herein, whereupon the speed of falling of the worker may be slowed or arrested. In such a circumstance, the kinetic energy of the falling worker may be dissipated e.g. by aforementioned friction brake 80 and/or by one or more shock absorbers (described in additional detail later herein), if either or both of such components are present.

In such uses, a safety device might be designed to bring a worker to a full stop (e.g., as in products commonly known as self-retracting lifelines), or merely to control or limit the rate of fall (e.g., as in products commonly known as a descender). In some cases the distinction between these general types of products may not be absolute, with some products serving to at least partially provide one or both functions. The centrifugally-operated apparatus disclosed herein may be usefully employed in any such safety device. In some embodiments, a device that uses the centrifugally-operated apparatus disclosed herein meets the requirements of ANSI Z359.1 2007 (as specified in 2007).

Often, housing 120 of self-retracting lifeline 100 is attached to a secure anchorage as mentioned previously. In such cases, anchorage opening 144 (resulting from aligned openings 141, 143 and 142 in anchorage plate 140, first complementary housing piece 122, and second complementary housing piece 121, respectively) of anchorage end 135 of device 100 may be used for this purpose. Such attachment may be provided e.g. by passing an anchorage line, rope, cable, etc. (an end of which is attached to a secure anchorage) through anchorage opening 144 and attaching the anchorage line securely to housing 120, e.g., by tieing it securely to anchorage beam 151 of housing 120 of device 100. If desired, multiple anchorage lines may be used, and may be attached to the same secure anchorage or to different secure anchorages. Devices such as D-rings, shackles, etc. may be used to attach an end of the anchorage line to anchorage opening 144/beam 151 of device 100. Devices such as swivel joints and the like may also be employed if desired. In some cases, it may be desired to directly (e.g., rigidly) attach housing 120 to a secure anchorage by way of a rigid fastening (anchorage) member passed through anchorage opening 144 (e.g., rather than using a flexible anchorage line or cable that extends from housing 120 to the secure anchorage).

Regardless of the particular method of connecting housing 120 to a secure anchorage, in the above methods of use of device 100 the outer end of line 65 is attached e.g. to a harness worn by a worker and line 65 is extended out of housing and retracted thereinto as explained above. In alternate methods of use, the outer end of line 65 may be attached to a secure anchorage with housing 120 of self-retracting lifeline 100 being attached to a harness worn by a worker. Centrifugally-operated apparatus 1 will function in substantially the same manner, however.

Other ancillary equipment may be employed with self-retracting lifeline 100 as desired. For example, a so-called shock absorber may be employed, e.g. somewhere within the length of line 65, or somewhere with the length of an anchorage line used to secure housing 120 to a secure anchorage. Such a shock absorber (often referred to as a tear web) may comprise e.g. a length of line that is folded in an accordionized configuration and is lightly sewn together and/or encased in a suitable casing, such that in the event of a predetermined load being applied, the line unfolds. Such arrangements may be useful e.g. when self-retracting lifeline 100 comprises ratchet ring 70 that is nonrotatably attached to housing 120 (as opposed to ratchet ring 70 being provided as part of a friction brake 80 that may provide somewhat more gradual braking action).

Housing 120 may be made of metal (e.g. cast or molded aluminum), or optionally may be comprised of, or may consist of, composite polymeric material (meaning a polymeric material that contains a reinforcing filler, e.g. glass fiber or the like). Suitable composite polymeric materials may include e.g. those materials available from EMS-CHEMIE AG North America, Sumter, S.C., under the trade designation GRIVORY (including in particular the products available under the trade designations GV and GVX). As mentioned above, housing 120 may optionally comprise anchorage plate 140 that is sandwiched between first and second complementary housing pieces 122 and 121. Anchorage plate 140 may be load-bearing and may be connected to housing 120 by way of at least one or two receptacles 152 in anchorage plate 140 through which bolts 148 pass as they fasten housing pieces 122 and 121 together. Bolts 148 may be similar or identical to other bolts (indicated generically by the reference number 149) that are used to fasten housing pieces 122 and 121 together; the reference number 148 is merely used to indicate one or more particular bolts that have the additional function of connecting anchorage plate 140 to housing 120. The optional use of composite polymeric housings and/or load-bearing anchorage plates is discussed in further detail in copending U.S. patent application Ser. No. 12/821,607, titled SAFETY DEVICES COMPRISING A LOAD-BEARING COMPOSITE POLYMERIC HOUSING AND A LOAD-BEARING ANCHORAGE PLATE, filed evendate herewith, which is herein incorporated by reference.

As mentioned, the centrifugally-operated apparatus disclosed herein may find use in any application in which it is desired to centrifugally motivate at least one rotating pawl to engage a component such as a ratchet. As such, the apparatus disclosed herein may find use in any suitable motorized device, equipment, and the like. However, in specific embodiments, the apparatus disclosed herein is part of a manually operated, portable device that can be carried by and operated manually by a person without specialized or motorized equipment.

It will be apparent to those skilled in the art that the specific exemplary structures, features, details, configurations, etc., that are disclosed herein can be modified and/or combined in numerous embodiments. All such variations and combinations are contemplated by the inventor as being within the bounds of the conceived invention. Thus, the scope of the present invention should not be limited to the specific illustrative structures described herein, but rather extends at least to the structures described by the language of the claims, and the equivalents of those structures. To the extent that there is a conflict or discrepancy between this specification and the disclosure in any document incorporated by reference herein, this specification will control.

What is claimed is:

1. A centrifugally-operated apparatus, comprising:
    a shaft with an axis of rotation generally aligned with the long axis of the shaft;

a pawl consisting of a single unitary body that is coaxially mounted on the shaft so that the entirety of the pawl is movable radially inwardly and outwardly from the shaft and wherein the pawl comprises an elongated shape with a long axis that is generally aligned with the direction in which the pawl is movable relative to the shaft, and wherein the pawl comprises an engaging end; and, a biasing mechanism that biases the engaging end of the pawl is biased radially inwardly and radially inwards toward the shaft, wherein the axis of rotation of the shaft passes through the pawl, wherein the pawl comprises a center of mass that is radially offset from the axis of rotation of the shaft, and, wherein the biasing mechanism biases the entirety of the pawl toward a first radial position in which the engaging end of the pawl moves radially outwardly along a generally straight line passing through the axis of rotation of the shaft and does not engage a ratchet ring that is located radially outwardly from the shaft, and wherein rotating the shaft and the pawl mounted thereupon above a predetermined speed overcomes the biasing mechanism and causes the entirety of the pawl to be centrifugally urged along the direction in which the pawl is movable relative to the shaft, to a second radial position in which the engaging end of the pawl engages the ratchet ring.

2. The apparatus of claim 1 wherein the pawl is mounted on the shaft so that the pawl cannot freely rotate relative to the shaft and cannot slidably move relative to the shaft in a direction along the long axis of the shaft.

3. The apparatus of claim 1 wherein an axial length of the shaft passes through a first portion of a shaft-receiving slot of the pawl and wherein the biasing mechanism comprises a biasing spring positioned in a second, remaining portion of the shaft-receiving slot.

4. The apparatus of claim 3 wherein the shaft-receiving slot of the pawl comprises an elongated shape with a long axis and wherein the outer surface of the axial length of the shaft that occupies the first portion of the shaft-receiving slot of the pawl comprises first and second flat, parallel, oppositely-facing portions that slidably contact, respectively, first and second flat, parallel surfaces of the shaft-receiving slot that are generally aligned with the direction in which the pawl is movable relative to the shaft.

5. The apparatus of claim 4 wherein the biasing spring comprises a coil spring with a long axis that is oriented generally along the long axis of the shaft-receiving slot of the pawl, and wherein a first end of the coil spring is seated against an outer surface of the axial length of the shaft that occupies the first portion of the shaft-receiving slot of the pawl, and a second end of the coil spring is seated against a surface of the shaft-receiving slot of the pawl that is distal to the shaft and to the engaging end of the pawl.

6. The apparatus of claim 1 further comprising a drum that is coaxially mounted on the shaft and that comprises first and second flanges that each extend generally radially outward from the shaft and that are positioned generally parallel to each other to define a space therebetween, and wherein the drum is positioned axially adjacent the pawl along the shaft.

7. The apparatus of claim 6 wherein at least one of the drum flanges comprises a guide pin and wherein the pawl comprises a elongated guiding slot with a long axis that is generally aligned with the direction in which the pawl is movable relative to the shaft, and wherein the guide pin of the flange resides within the elongated guiding slot of the pawl.

8. The apparatus of claim 6 wherein at least one of the drum flanges comprises an opening through which a portion of the axial length of the shaft passes, and wherein the drum flange opening and the axial length of the shaft each comprise at least one interfering feature, the interfering features of the flange and of the shaft mating with each other so as to physically prevent the drum from freely rotating relative to the shaft.

9. The apparatus of claim 6 further comprising a length of line that is at least partially wound in the space defined between the first and second flanges of the drum and a first end of which is secured to the shaft.

10. The apparatus of claim 9 wherein the first end of the length of line is attached to an axial portion of the shaft that is located in between the first and second flanges of the drum, wherein the interference of the line with the flanges of the drum physically prevents the drum from slidably moving relative to the shaft in a direction along the long axis of the shaft.

11. The apparatus of claim 10 wherein the drum comprises at least one post in the space in between the first and second flanges, wherein the interference of the line with the at least one post physically prevents the drum from freely rotating relative to the shaft.

12. The apparatus of claim 9 further comprising a torsion spring that imparts a biasing force that serves to rotate the shaft in a direction that serves to wind the length of line onto the drum.

13. The apparatus of claim 9 wherein the shaft comprises first and second terminal axial ends, each of which are rotatably connected to a housing that at least partially encloses the shaft, pawl and drum.

14. The apparatus of claim 13 wherein the ratchet ring is fixedly and nonrotatably attached to the housing.

15. The apparatus of claim 13 wherein the ratchet ring is part of a friction brake that comprises at least a pressure plate and a friction ring and that is nonrotatably mated to the housing.

16. The apparatus of claim 13 wherein the friction brake is a preassembled and pretorqued friction brake.

17. The apparatus of claim 13 wherein the housing is comprised of a molded composite polymeric resin.

18. The apparatus of claim 13 wherein the apparatus is part of a safety device configured to arrest or limit the rate of fall of a user of the safety device.

19. A safety device configured to arrest or limit the rate of fall of a user of the device and comprising the apparatus of claim 13.

20. The safety device of claim 19 wherein the safety device is a self-retracting lifeline.

* * * * *

UNITED STATES PATENT AND TRADEMARK OFFICE
CERTIFICATE OF CORRECTION

PATENT NO. : 8,430,208 B2  
APPLICATION NO. : 13/566188  
DATED : April 30, 2013  
INVENTOR(S) : Stephen Griffiths Page 1 of 1

It is certified that error appears in the above-identified patent and that said Letters Patent is hereby corrected as shown below:

In the Claims

Column 11
Line 10, In Claim 1, after "pawl" delete "is biased radially inwardly and".

Column 11
Lines 19-21, In Claim 1, delete "moves radially outwardly along a generally straight line passing through the axis of rotation of the shaft and" and insert -- is biased radially inwardly and --, therefor.

Signed and Sealed this
Thirteenth Day of August, 2013

Teresa Stanek Rea
*Acting Director of the United States Patent and Trademark Office*